US009246795B2

(12) United States Patent
Madaiah et al.

(10) Patent No.: US 9,246,795 B2
(45) Date of Patent: Jan. 26, 2016

(54) PROTECTION METHOD AND SYSTEM FOR PREPLANNING DUALITY OF PATHS FOR A UNICAST AND/OR A MULTICAST TRAFFIC

(75) Inventors: Vinod Kumar Madaiah, Bangalore (IN); Advait Abhay Dixit, Bangalore (IN)

(73) Assignee: Tejas Networks Limited, Bangalore (IN)

( * ) Notice: Subject to any disclaimer, the term of this patent is extended or adjusted under 35 U.S.C. 154(b) by 36 days.

(21) Appl. No.: 14/004,083

(22) PCT Filed: Aug. 11, 2011

(86) PCT No.: PCT/IN2011/000530
§ 371 (c)(1),
(2), (4) Date: Feb. 4, 2014

(87) PCT Pub. No.: WO2012/120527
PCT Pub. Date: Sep. 13, 2012

(65) Prior Publication Data
US 2014/0149602 A1 May 29, 2014

(30) Foreign Application Priority Data
Mar. 7, 2011 (IN) .............................. 681/CHE/2011

(51) Int. Cl.
*H04L 12/705* (2013.01)
*H04L 12/437* (2006.01)
*H04L 12/751* (2013.01)
*H04L 12/715* (2013.01)
*H04L 12/46* (2006.01)

(52) U.S. Cl.
CPC .............. *H04L 45/18* (2013.01); *H04L 12/437* (2013.01); *H04L 12/4637* (2013.01); *H04L 45/02* (2013.01); *H04L 45/04* (2013.01)

(58) Field of Classification Search
None
See application file for complete search history.

(56) References Cited

U.S. PATENT DOCUMENTS

2008/0080698 A1   4/2008  Williams et al.
2008/0239943 A1  10/2008  Hauenstein et al.
2010/0290367 A1  11/2010  Karandikar et al.

FOREIGN PATENT DOCUMENTS

WO    WO 2009087557 A1 *  7/2009  ............ H04L 12/437

\* cited by examiner

*Primary Examiner* — Kerri Rose
(74) *Attorney, Agent, or Firm* — Woodard, Emhardt, Moriarty, McNett & Henry LLP

(57) ABSTRACT

The present invention relates to a protection method based on preplanning duality of paths for a unicast and/or a multicast traffic, by extending a network into hierarchy of connected rings to form a hierarchical ring based tree (HRBT) structure. The present method enables a deterministic method to route a frame (or packet) when a primary path to destination is unavailable due to node/link failure, bandwidth crunch, misconfiguration, etc. If both primary and secondary (or alternate) path are pre-provisioned before traffic is allowed, the switch-over time from primary (P) path to secondary (S) path will be minimized, thus enabling 50 ms protection switching in packet network.

8 Claims, 7 Drawing Sheets

US 9,246,795 B2

PROTECTION METHOD AND SYSTEM FOR PREPLANNING DUALITY OF PATHS FOR A UNICAST AND/OR A MULTICAST TRAFFIC

FIELD OF THE INVENTION

The invention relates to Hierarchical Ring based Tree (HRBT) for unicast and/or multicast traffic in a Carrier Ethernet switch network. More particularly, the invention relates to a method and system to obtain hierarchy of connected rings and capable of providing 50 ms protection in a preplanned path.

BACKGROUND OF THE INVENTION

Networks design is important in deciding the performance of the network during fault conditions. Traditionally, the ease of operation, administration, management and provisioning (OAMP) of ring based network design of transport networks like Synchronous Digital Hierarchy (SDH) and Synchronous Optical Network's (SONET) have triggered extensive research of similar mechanisms for the packet network.

The ring based network design like Unidirectional Switch Ring (UPSR) and Bidirectional Line Switch Ring (BLSR) yields a number of advantages, including simplified management and control of the network, and fast restoration mechanisms upon link or node failure occurrence. The design of a given arbitrary topology in the form of a set of interconnected rings reduces the overall network connectivity and hence may limit the number of distinct cables that carry working fibers in the final network layout. With reduced number of cables in the system the overall network cost may also be reduced. Due to these and other advantages, it is not surprising that ring based network designs are often preferred to other network topologies.

The new networks are required to have both high capacity and high survivability. In a ring structure there are two ways to send traffic, clockwise or counter-clockwise. This means that the traffic can be sent even if a single link or node breaks down, by using the opposite direction of the ring. The rings are so called self healing rings (SHR) where some capacity is unused until the event of a link or node failure. The technology is based on SDH standard for optical transmission. Newer packet-based ring standards also behave in similar fashion (for example G.8031)

There have been efficient protection mechanisms for protecting multicast traffic in a mesh or ring topology network utilizing label switching protocols. The label switching technique was developed to expedite the look-up process at each network node as packets travel from a source to a destination. Abstractly, label switching involves attaching a label to a packet that enables the next node (i.e., hop) of the packet to be quickly determined by an intermediate network node that receives the packet. An example for such a label switching protocol is the Multi-Protocol Label Switching (MPLS) protocol.

The existing methods are not deterministic to route a frame (or packet) when a primary path to destination is unavailable due to node/link failure, bandwidth crunch, mis-configuration, etc. Also, there is no provision of primary and secondary (or alternate) path to route the traffic to minimize the switch-over time to enable 50 ms protection switching in a packet network. Furthermore, even though the traffic is provisioned results in increase in the complexity of the network.

Thus there is a need to have a hierarchy of cycles capable of providing 50 ms protection for unicast and multicast traffic. Also, there is therefore a requirement of a network system which allows for better propagation of packets through the network and allows for quick recovery at the time of fault conditions.

SUMMARY OF THE INVENTION

An aspect of the present invention is to address at least the above-mentioned problems and/or disadvantages and to provide at least the advantages described below.

Accordingly, an aspect of the present invention is to provide a protection method based on preplanning duality of paths for a unicast and/or a multicast traffic, by extending a network into hierarchy of connected rings to form a hierarchical ring based tree (HRBT) structure, the method comprising: initiating a configuration frame (CF) on at least one preferred node (primary node) in a network, wherein the preferred node (primary node) is allowed to broadcast the CF on all ports except the received port, receiving the configuration frame (CF) by all other nodes (secondary nodes) in the network updates the fields in CF and floods the updated CF through the other ports configured to participate in the formation of rings, identifying one or more fork node in the network while broadcasting the CF, comparing, on at least one secondary node i.e. comparison node, the received two CF simultaneously from the neighboring secondary nodes, wherein the comparison includes determining the direction of primary and secondary paths of the tree by checking the last appended node IDs in the received CFs or the ingress port IDs of the received CFs or thereof, waiting for RCF to be received at all the ports of the Node or collapsed hierarchy or collapsed node through which CF was flooded, generating at least two Reverse Configuration Frame (RCF) from the comparison node to flood the updated RCF to participate in the formation of rings, configuring the fork node to not to take any decision based on the RCF for forming primary and secondary path when peering fork node is not within the same hierarchy or a common parent hierarchy as the fork node and receiving at least two Reverse Configuration Frame (RCF) at the primary node or source node or collapsed hierarchy to identify a hierarchy ring tree thereby breaking the loop by blocking the traffic on primary and secondary tree accordingly.

In accordance with another aspect of the present invention provide a protection system based on preplanning duality of paths for a unicast and/or a multicast traffic, by extending a network into hierarchy of connected rings to form a hierarchical ring based tree (HRBT) structure, the system comprising: at least one primary node, and a plurality of secondary node, wherein at least two secondary node originate from the primary node connect back to back with other secondary nodes thereby forming one or more rings, wherein primary and secondary nodes are communicatively coupled to exchange data from one to the other, wherein the system is configured for: initiating a configuration frame (CF) on at least one preferred node (primary node) in a network, wherein the preferred node (primary node) is allowed to broadcast the CF on all ports except the received port, receiving the configuration frame (CF) by all other nodes (secondary nodes) in the network updates the fields in CF and floods the updated CF through the other ports configured to participate in the formation of rings, identifying one or more fork node in the network while broadcasting the CF, comparing, on at least one secondary node i.e. comparison node, the received two CF simultaneously from the neighboring secondary nodes, wherein the comparison includes determining the direction of primary and secondary paths of the tree by checking the last appended node IDs in the received CFs or the ingress port IDs of the received CFs or thereof, waiting for RCF to be received at all the ports of the Node or collapsed hierarchy or collapsed node through which CF was flooded, generating at least two Reverse Configuration Frame (RCF) from the comparison node to flood the updated RCF to participate in the formation of rings, configuring the fork node to not to take any decision based on the RCF for forming primary and secondary path when peering fork node is not within the same hierarchy or a common parent hierarchy as the fork node and receiving at least two Reverse Configuration Frame (RCF) at the primary node or source node or collapsed hierarchy to identify a hierarchy ring tree thereby breaking the loop by blocking the traffic on primary and secondary tree accordingly.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Figure 1:
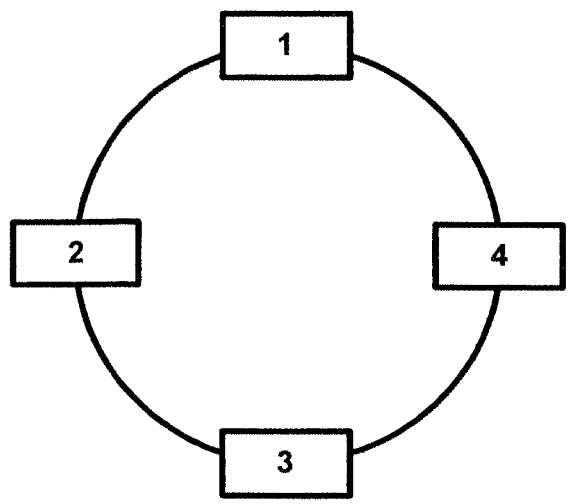
FIGS. 1(a) and (b) shows a typical exemplary topology working in a Hierarchical Ring based Tree (HRBT) mechanism.
Figure 1:
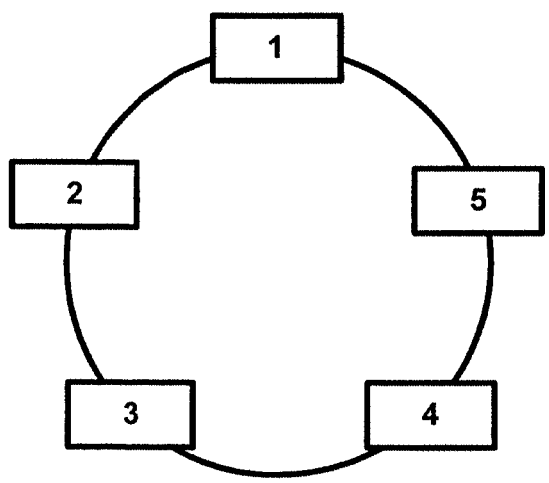
Figure 2:
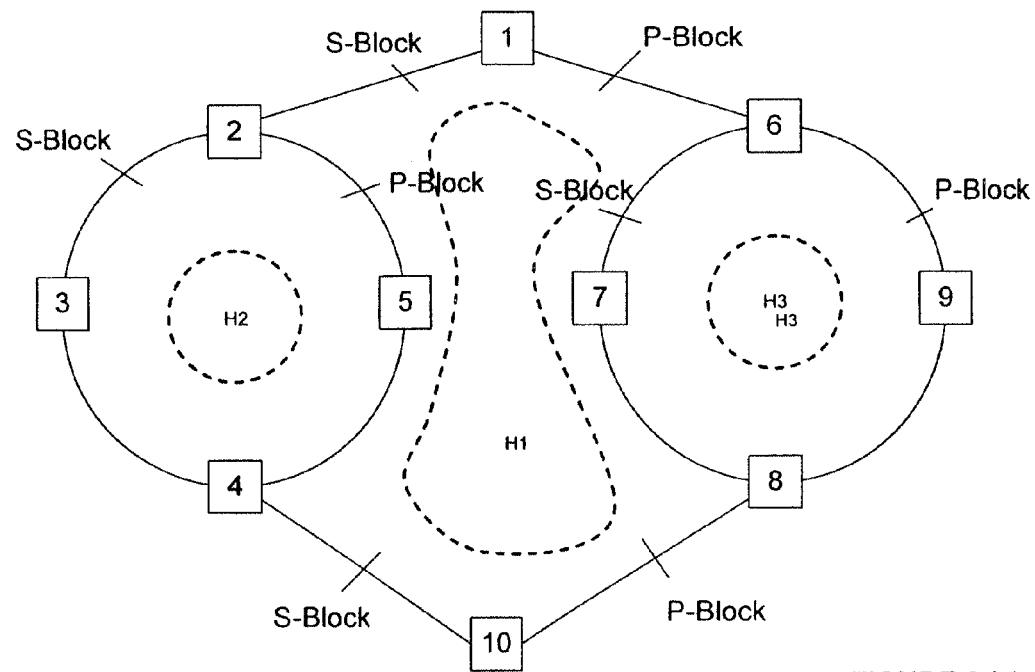
FIGS. 2(a) and (b) describes an exemplary topology which limits the Hierarchical Ring based Tree (HRBT) mechanism.
Figure 2:
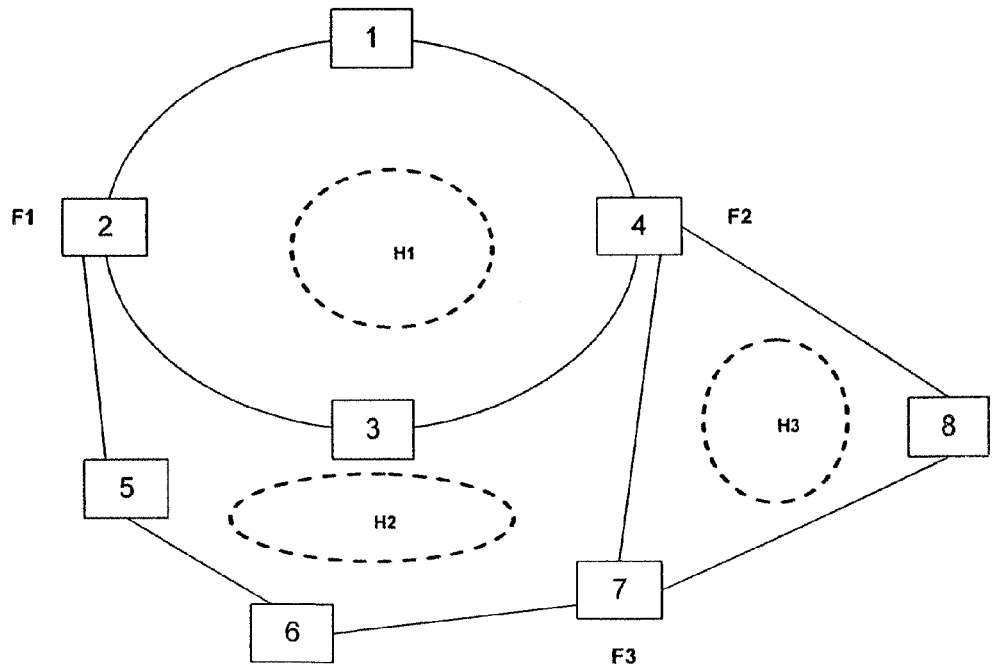

Persons skilled in the art will appreciate that elements in the figures, are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAIL DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved, exactly, but that deviations or variations, including for example, tolerances, measurement error, measurement accuracy limitations and other factors known to those of skill in the art, may occur in amounts, that do not preclude the effect the characteristic was intended to provide.

FIGS. 1 through 7, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIGS. 1(a) and (b) shows a typical exemplary topology working in a Hierarchical Ring based Tree (HRBT) mechanism. FIG. 1(a) shows a topology of four nodes connected cyclically 1-2-3-4-1 with seed Configuration frame (CF) introduced at node 1. A seed frame triggers the HRBT. The total hop delay (propagation delay and transmission delay) is assumed to be same. Node 1 will update the seed CF with its node ID, say 1, and flood the updated CF through both its port, one towards node 2 and another towards node 4. Nodes 2 and 4 update the CF with their node IDs, say 2 and 4, and floods through only available port towards 3. Node 3 receives two CF simultaneously from Nodes 2 and 4. It compares the last (or recently) appended node IDs in both CFs; chooses the direction of smaller node ID as Primary and the other direction as Secondary. Node 3 becomes comparison node (CN) in this example. Comparison field in CF is updated with ID of Node 3, say 3.

After comparison process, at node 3, information from one CF is transferred to the other, following which CF is renamed as Reverse Configuration Frame (RCF) and allowed to continue to Source node. RCF sent towards Node 2 will have information, in the form of P-bit, that node 2 is in the direction of reaching Source node on Primary tree. Node 2 will infer that the complementary (reverse) direction is designated as Secondary. When Source node receives two RCFs, from nodes 2 and 4, it uses information in Comparison field (C-field) to pair them. (When multiple rings are connected at node 1, information in C-field will enable node 1 to identify rings correctly.) Once rings are identified, node 1 (which is the source node) will break the loop. It will block traffic on link 1-4 for primary (P) tree and on link 1-2 for secondary (S) tree. Links 2-3 and 3-4 will not block traffic as they are part of P and S trees. Any traffic sent to a node on Primary (Secondary) cannot exit on link 1-4 (1-2). P-tree and S-tree are bi-directional.

FIG. 1(b) shows a topology of five nodes: 1-2-3-4-5-1 will have two comparison nodes i.e. CN-node 3 and node 4. 1-2-3-4-5 will form P tree and 1-5-4-3-2 will form S tree.

FIGS. 2(a) and (b) describes an exemplary topology which limits the Hierarchical Ring based Tree (HRBT) mechanism. The HRBT has certain topologies which are restricted or does not work in some topology (as shown in FIG. 2(a)). In the HRBT mechanism, the location of blocked-link for Primary and Secondary is not deterministic; sometimes it can be at unwanted location. FIG. 2(a) shows blocked link for primary and secondary where Primary (Secondary) traffic flows through another hierarchy, and thereby forcing the other hierarchy to perform inefficiently. Had the blocked links been at the correct location, attached to the source node or other hierarchy, then all hierarchies will perform at maximum utilization. Notice that due to this behavior, the network is divided: it is not possible for packets to travel from H2 to H3 while following just P-trees (or just S-trees). Another limitation of HRBT is depicted in FIG. 2(b) i.e. Fork-Node F1 does not know whether fork-node F2 or fork-node F3 will be part of the hierarchy that F1 forms. It is also possible and can be seen from FIG. 2(b) that, if Hierarchy (H2) and Hierarchy (H3) are faster in forming a Hierarchy than H1, then there will be one more S-block and P-block.

Figure 3:
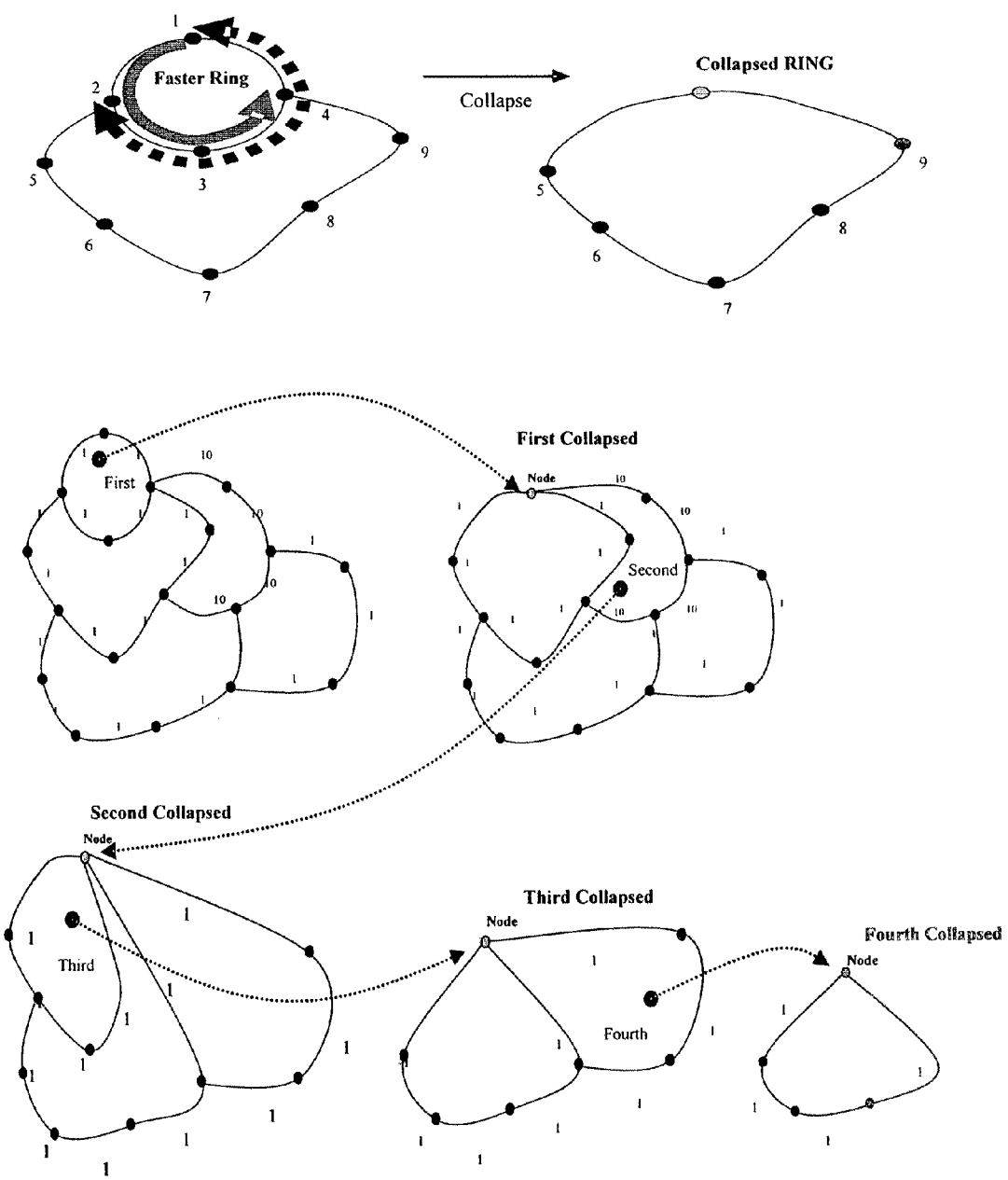
FIG. 3 illustrates an example topology describing the convergence of Hierarchical Ring based Tree (HRBT) mechanism, according to one embodiment of the invention.

FIG. 3 illustrates an example topology describing the convergence of Hierarchical Ring based Tree (HRBT) mechanism, according to one embodiment of the invention. The convergence of HRBT is demonstrated in FIG. 3 which addresses the limitation (as described above in FIG. 2) with the following assumption as described below.

Firstly, the fastest ring converges first. The fastest ring has lowest self-reach-ability time, which is the fundamental principle of HRBT. A node on such ring will receive a test frame egressed on one of its port through another of its member port at an earlier time than any other node on any other ring. Secondly, the fastest ring is collapsed into a logical node. C-node(s) per ring is unique and the result of comparison in one hierarchy is independent of comparison in another hierarchy. Thirdly, in case of Tie, break is done based on smallest node ID, say of C-nodes. Fourth, the method working is not complete unless the node or collapsed node or collapsed hierarchy had not received RCF. Fifth, fork nodes are configured to not to take any hierarchy formation decision for forming primary and secondary path based on the RCF when peering fork node is not within the same hierarchy or a common parent hierarchy as the fork node.

Together with the five assumptions as defined above, the correct convergence of the improved HRBT mechanism. We impose these assumptions on the working of the technique, so that the limitations of typical HRBT can be removed from the improved HRBT mechanism. FIG. 3 pictorially explain that once the 5 assumptions are used as axiom for the proof, convergence and correctness can be guaranteed.

Figure 4:
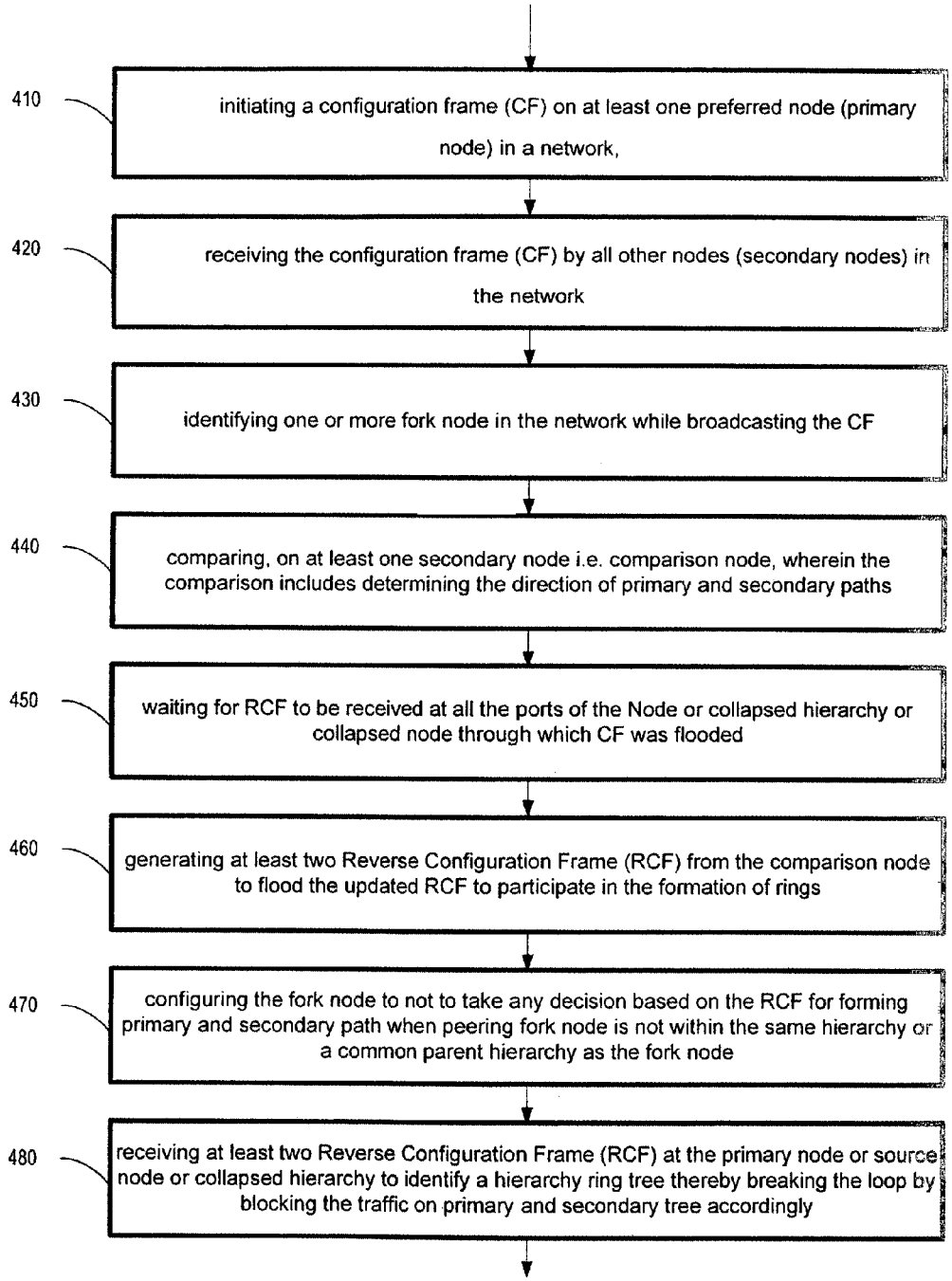
FIG. 4 illustrates flow chart of protection method based on preplanning duality of paths for a unicast and/or a multicast traffic, by extending a network into hierarchy of connected rings to form a hierarchical ring based tree (HRBT) structure, according to one embodiment of the present invention.
Figure 5:
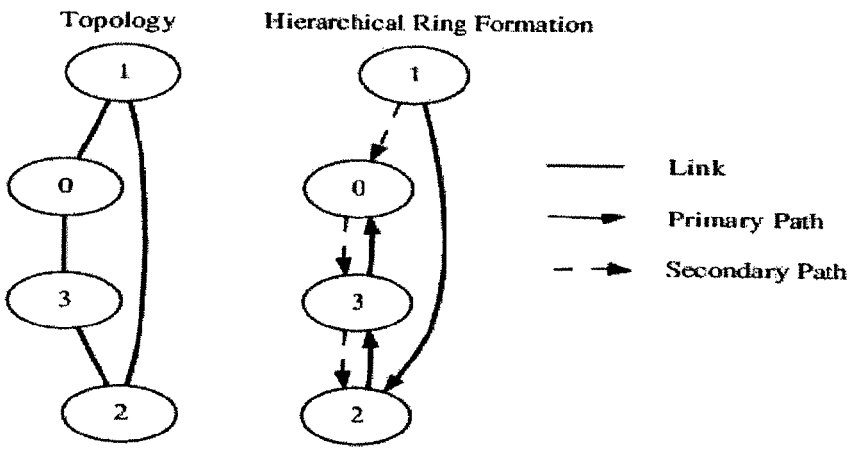
FIGS. 5(a) and (b) illustrates working of an improved Hierarchical Ring based Tree (HRBT) mechanism (ring formation) in a ring topology, according to one embodiment of the present invention.
Figure 5:
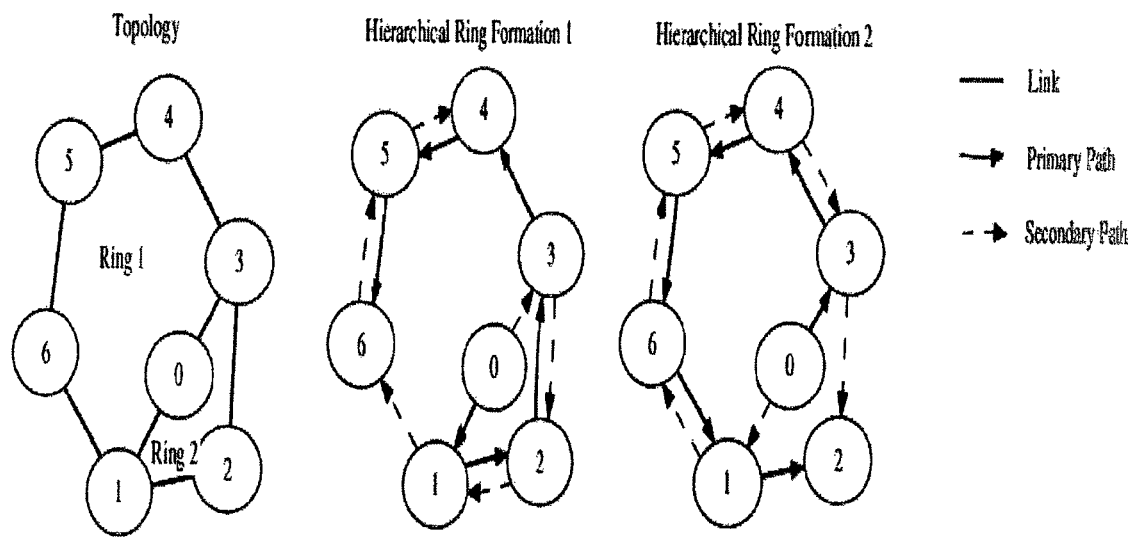

FIG. 4 illustrates flow chart of protection method based on preplanning duality of paths for a unicast and/or a multicast traffic, by extending a network into hierarchy of connected rings to form a hierarchical ring based tree (HRBT) structure, according to one embodiment of the present invention. At least some part of the method may be implemented as a computer program stored on a computer-readable medium, such as firmware, for execution by a processor. Referring now to FIG. 4, there is illustrated a protection method based on preplanning duality of paths for a unicast and/or a multicast traffic, by extending a network into hierarchy of connected rings to form a hierarchical ring based tree (HRBT) structure.

At step 410, the method initiates a configuration frame (CF) on at least one preferred node (called as primary node) in a network, wherein the preferred node (primary node) is allowed to broadcast the CF on all ports except the received port. The configuration frame includes one or more fields, wherein the fields includes but not limited to Field for ordering information (Field_O), Field for carrying MAC address information (Field_MAC), Field to indicate nodes which compare configuration frames called C-nodes (Field_C), Field to designate Primary or Secondary (Field_PS), Field to indicate which node is connected to routers (Field_R), Field to indicate nodes at which packets gets forked (Field_F), Field to indicate Pairing of C-nodes not required (Pairing_Not_Req) and combinations thereof.

Also, the configuration frame include ordered node IDs of all the nodes it transits by increasing the size of CF at every hop until comparison is performed on at at-least one nodes, and wherein the ordered node IDs enable the returning configuration frame (RCF) to trace the return path to Source node.

At step 420, the method receives the configuration frame (CF) by all other nodes (secondary nodes) in the network updates the fields in CF and floods the updated CF through the other ports configured to participate in the formation of rings At step 430, the method identifies one or more fork node in the network while broadcasting the CF. The fork nodes are identified by, when the node has more than two nodes attached during broadcasting the information in the network are called as Fork nodes.

At step 440, the method compares one or more secondary node i.e. called as comparison node, the comparison is done when the two CF is simultaneously received from the neighboring secondary nodes. The comparison includes determining the direction of primary and secondary paths of the tree by checking the last appended node IDs in the received CFs or the ingress port IDs of the received CFs or thereof.

At step 450, the method waits for RCF from all the ports of the Node or collapsed hierarchy or collapsed node through which CF was flooded.

At step 460, the method generates two or more Reverse Configuration Frame (RCF) from the comparison node to unicast towards the parent hierarchy or source node the updated RCF to participate in the formation of rings.

At step 470, the method configures the fork node to not to take any decision based on the RCF for forming primary and secondary path when peering fork node is not within the same hierarchy or a common parent hierarchy as the fork node.

At step 480, the method receives two or more Reverse Configuration Frame (RCF) at the primary node or source node or collapsed hierarchy to identify a hierarchy ring tree thereby breaking the loop by blocking the traffic on primary and secondary tree accordingly. The receipt of two or more Reverse Configuration Frame (RCF) triggers the source node to set direction of smallest node ID as the primary path and direction of next smallest node ID as the secondary path.

Although the method flowchart includes steps 410-480 that are arranged serially in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

FIGS. 5(a) and (b) illustrates working of an improved Hierarchical Ring based Tree (HRBT) mechanism (ring formation) in a ring topology, according to one example embodiment of the present invention.

FIG. 5(a) shows the working of improved HRBT mechanism in a ring topology, according to one embodiment of the present invention. As shown in figure, Node 1 is the start-node where the first C-Frame is injected. All links in the topology are identical. The hierarchical ring formation process starts at Node 1 which sends C-Frames to Node 0 and Node 2. The C-Frames contain the Node 1's node-ID. Upon receiving the C-Frame from Node 1, Node 2 appends its node-ID to the C-Frame and forwards it to Node 3 and Node 0 appends its node-ID to the C-Frame and forwards it to Node 3. Since all links are identical, Node 3 will receive C-Frames from Node 0 and Node 2 at the same time.

However, nodes should process all frames sequentially. In the present case, considering Node 3 first processes the frame from Node 2. The other case may be similar. In the present example, Node 3 will append its node-ID to the C-Frame and forward it to Node 0. Then, Node 3 will process the C-Frame froth Node 0. Since this is the second C-Frame that it received, it deduces that Node 1 is the S-Node of this hierarchy. The R-Info generated is as follows: "CN Node 3 Node 0 SN Node 1". It generates a RC-Frame, appends its node-ID to the RC-Frame and forwards the RC-Frame to Node 2. Node 3 sets its local ring-ID variable to NULL (hierarchy is not formed yet.) and sets its P-Bit and S-Bit on both ports. When Node 0 receives its second C-Frame from Node 3, it generates a RC-Frame, appends its node-ID to the RC-Frame and forwards the RC-frame to Node 1. Node 0 sets its local ring-ID variable to NULL and sets its P-Bit and S-Bit on both ports. When Node 2 receives a RC-Frame from Node 3, it appends its node-ID to the RC-Frame and forwards the frame to Node 1. Node 2 sets its local ring-ID variable to NULL and sets its P-Bit and S-Bit on both ports. When Node 1 receives the RC-Frame from Node 0, it stores the frame and waits for the pair node-ID frame. It sets the P-Bit and S-Bit on the ingress ports.

When Node 1 receives the RC-Frame from Node 2, the ring formation is considered complete. From the two RC-Frames, Node 1 calculates the ring-ID as "1 0 3 2". Then, it generates a HRCY-Frame, appends the ring-ID and R-Info and transmits the frame to Node 0 and Node 2. In the HRCY-Frame transmitted to Node 0, the notification field is "SSET" and in the frame transmitted to Node 2 it is "PSET". Node 1 resets the P-Bit on its port connected to Node 0 and S-Bit on its other port.

When Node 2 receives the HRCY-Frame from Node 1, it resets the S-Bit corresponding to the ingress port and stores the hierarchical ring information. In the HRCY-Frame, Node 2 modifies the notification field to "NSET" and forwards the frame to Node 3.

When Node 0 receives the HRCY-Frame from Node 1, it resets the P-Bit corresponding to the ingress port and stores the hierarchical ring information. In the HRCY-Frame, Node 0 modifies the notification field to "NSET" and forwards the frame to Node 3.

When Node 3 receives the HRCY-Frame it stores the ring information. This completes flooding of hierarchical ring information to all members of the hierarchical ring.

FIG. 5(b) shows another working example of improved HRBT mechanism in a ring topology, according to an example embodiment of the present invention. As shown in figure, a topology with two rings and assuming that all links are identical. Hierarchical rings will be formed as shown. Ring 2 has fewer nodes, it will be formed before Ring 1. Ring 2 will consist of four individual nodes: Node 0, 1, 2 and 3. Ring 1 will consist of collapsed Ring 2 and three individual nodes: Nodes 4, 5 and 6. Considering in the present case where links from Node 2 are very slow, where Ring 1 will be formed before Ring 2. The hierarchical ring formation where Ring 1 will consist of six individual nodes: Node 0, 1, 3, 4, 5 and 6, and Ring 2 consists of collapsed Ring 1 and Node 2.

Figure 6:
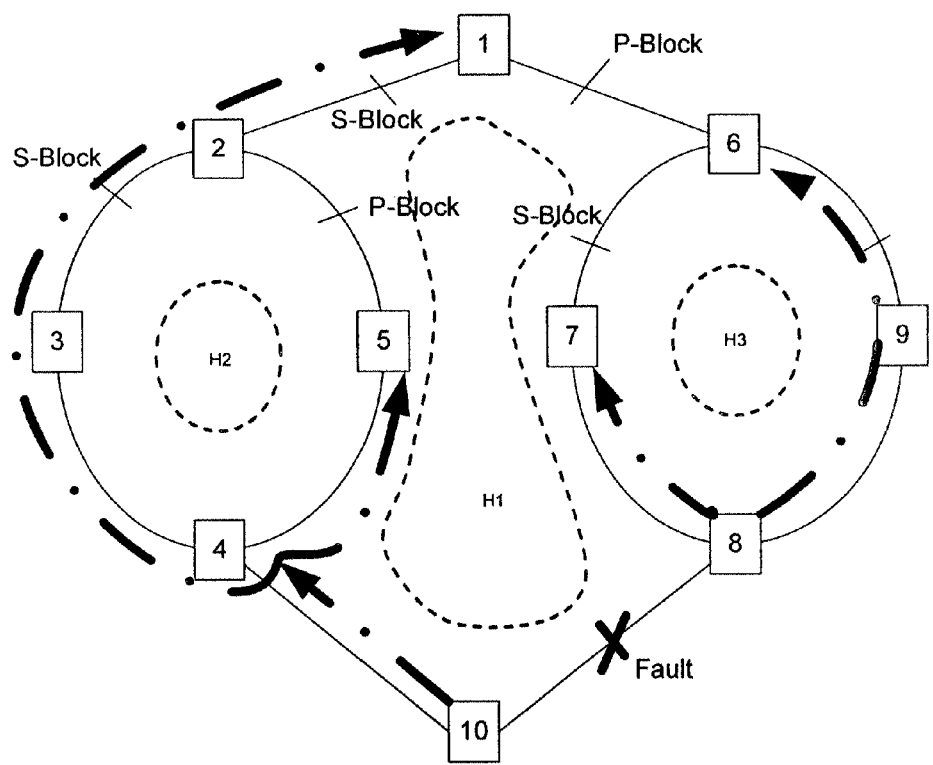
FIG. 6 shows a solution over the limitations of the Hierarchical Ring based Tree (HRBT) mechanism described in FIG. 2(a).

FIG. 6 shows a solution over the limitations of the Hierarchical Ring based Tree (HRBT) mechanism described in FIG. 2(a). Particularly, in FIG. 6, shows an improved HRBT mechanism, where the location of blocked-link for Primary and Secondary is deterministic, efficient, links are blocked at the correct location, and there will be only one S-block and P-block in any individual hierarchy. FIG. 6 describes an exemplary topology of an improved Hierarchical Ring based Tree (HRBT) mechanism in accordance with an embodiment of the present invention. Referring to FIG. 6, where a fault has occurred between the nodes 8 and 10 (as shown). This fault divides the hierarchy H1 into two. All the nodes in that hierarchy will be notified about the fault. Node 1, upon receiving the fault notification identifies that it has to close or bridge the division in the hierarchy. Frame coming to node 1 on primary tree will be bridged by node 1 using secondary tree towards node 6 or hierarchy H3. When node 6 receives the frame from node 1 on secondary tree, as it already knows that H1 is divided, it will forward the frame to appropriate destination using P or S tree.

Also, it describes protection from a link failure i.e. if a link or node or collapsed node fails in a hierarchy leading to the isolation or division of the hierarchy using exactly one of P or S tree, the duality of preplanned paths provides 50 ms protection switching because the hierarchy will be fully connected by simultaneously using both P and S tree within the hierarchy.

Figure 7:
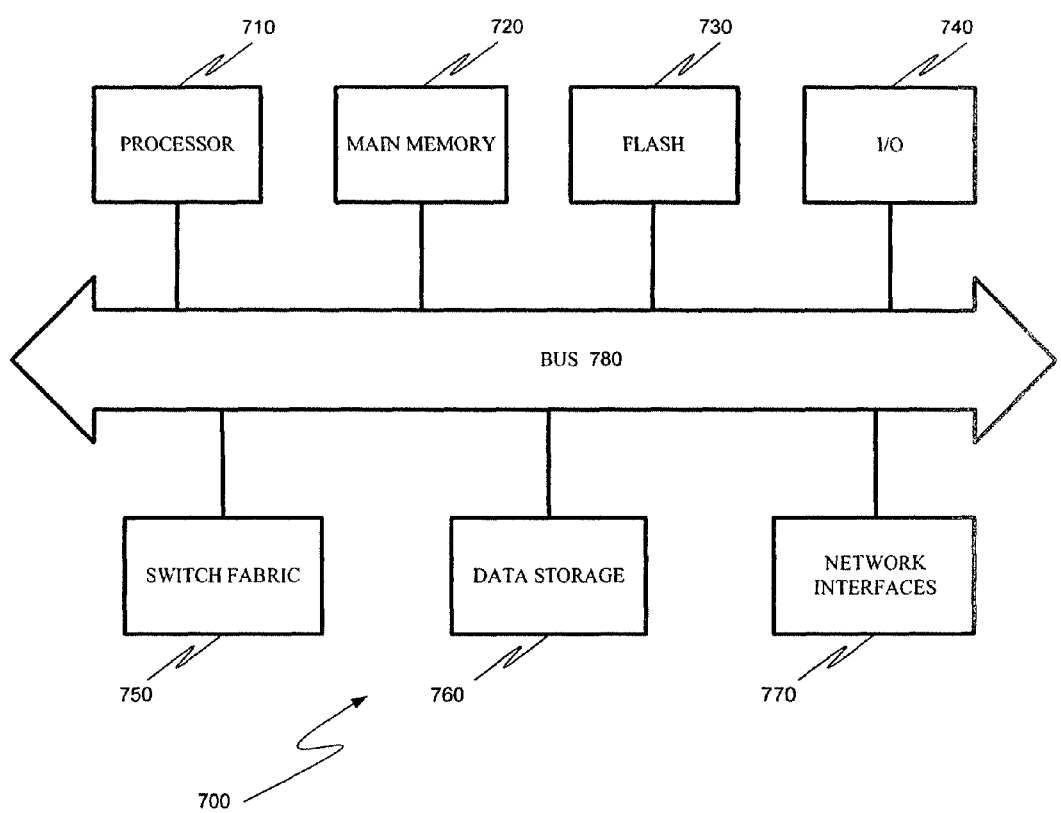
FIG. 7 illustrates one embodiment of a suitable computing environment in which certain aspects of the invention illustrated in FIGS. 3-6 may be practiced.

In the illustrated embodiment of FIG. 7, the protection method based on preplanning duality of paths for a unicast and/or a multicast traffic, by extending a network into hierarchy of connected rings to form a hierarchical ring based tree (HRBT) structure, according to the present invention as discussed above may be implemented as a series of software routines run by computer system 700 of FIG. 7. These software routines comprise a plurality or series of instructions to be executed by a processing system in a hardware system, such as processor 710 of FIG. 7. Initially, the series of instructions are stored on a data storage device 760, memory 720 or flash 730. It is to be appreciated that the series of instructions can be stored using any conventional computer-readable or machine-accessible storage medium, such as a diskette, CD-ROM, magnetic tape, DVD, ROM, etc. It is also to be appreciated that the series of instructions need not be stored locally, and could be stored on a propagated data signal received from a remote storage device, such as a server on a network, via a network/communication interface 770. The instructions are copied from the storage device 760, such as mass storage, or from the propagated data signal into a memory 720 and then accessed and executed by processor 710.

In alternate embodiments, the present invention is implemented in discrete hardware or firmware. For example, one or more application specific integrated circuits (ASICs) could be programmed with the above-described functions of the present invention.

Accordingly, a method and system is described to obtain hierarchy of connected rings and capable of providing protection in a preplanned path. From the foregoing description, those skilled in the art will recognize that many other variations of the present invention are possible. In particular, while the present invention has been described as being implemented in a metropolitan area network comprising multiple nodes or switches, it should be noted that some of the logic described herein may be distributed in other components of a network or implemented in a network of different scope such as a local area network without departing from the scope of the present invention.

FIGS. 1-7 are merely representational and are not drawn to scale. Certain portions thereof may be exaggerated, while others may be minimized. FIGS. 1-7 illustrate various embodiments of the invention that can be understood and appropriately carried out by those of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively.

We claim:

1. A protection method based on preplanning duality of paths for a unicast and/or a multicast traffic, by extending a network into hierarchy of connected rings to form a hierarchical ring based tree structure, the method comprising:
   initiating a configuration frame on at least one primary node in a network, wherein the primary node is allowed to broadcast the configuration frame on all ports except the received port;
   receiving the configuration frame by one or more secondary nodes in the network, the one or more secondary nodes not including the primary node;
   updating the fields in the configuration frame;
   broadcasting the updated configuration frame through the other ports in the secondary nodes configured to participate in the formation of hierarchical rings;
   identifying one or more fork nodes in the network while broadcasting the configuration frame;
   comparing, on at least one comparison node of the secondary nodes, a first and a second configuration frame received from neighboring secondary nodes, wherein the comparison of the first and second configuration frames includes determining a direction of primary and secondary data paths by checking the last appended node IDs in the two configuration frames, or the ingress port IDs of the received configuration frames;
   generating a reverse configuration frame by transferring information from the first configuration frame to the second configuration frame;
   sending the reverse configuration frame to a parent node of the comparison node from which the first and second configuration frames were received;
   waiting for the reverse configuration frame to be received at all ports of the parent node through which the configuration frame was previously flooded;
   configuring the one or more fork nodes to not to take any decision based on the reverse configuration frames for forming the primary and secondary data paths when a peering fork node is not within the same hierarchy or a common parent hierarchy as the fork node; and
   receiving two reverse configuration frames at the primary node, the primary node setting a first direction of the smallest node ID as the primary data path, and a second direction of the next smallest node ID as the secondary data path.

2. The method of claim 1, wherein the fork nodes are identified as fork nodes when a node has more than two nodes attached when during broadcasting of the configuration frame.

3. The method of claim 1, wherein the configuration frame includes ordered node IDs of all the nodes it transits by increasing the size of configuration frame at every hop until comparison is performed on at least one node, and wherein the ordered node IDS enable the returning configuration frame to trace the return path to a primary node.

4. The method of claim 1, wherein the receiving at least two reverse configuration frames triggers the receiving node to set the direction of smallest node ID as the primary data path and direction of next smallest node ID as the secondary data path.

5. The method of claim 1, wherein the configuration frame includes a plurality of fields, the fields including an ordering information field (Field_O), a MAC address field (Field_MAC), a configuration frame comparison field (Field_C), a primary or secondary data path field (Field_PS), a router connection field (Field_R), a fork packets field (Field_F), a configuration node pairing field (Pairing_Not_Required), and any combination thereof.

6. A protection system based on preplanning duality of paths for a unicast and/or a multicast traffic, by extending a network into hierarchy of connected rings to form a hierarchical ring based tree structure, the system comprising:
   at least one primary node; and
   a plurality of secondary nodes, wherein at least two secondary nodes originate from the primary node and connect back to back with other secondary nodes thereby forming one or more rings;
   wherein the primary and the secondary nodes are communicatively coupled to exchange data from one to the other, and
   wherein the system is configured to:
      update a configuration frame on at least one primary node in a network, wherein-the primary node is configured to broadcast the configuration frame on all ports except a received port the configuration frame was received on;
      receive the configuration frame by all other secondary nodes in the network;
      update the fields in the configuration frame;

flood the updated the configuration frame through other ports on other primary and secondary nodes configured to participate in the hierarchical ring based tree structure;

identify one or more fork nodes in the network while broadcasting the configuration frame;

compare, on at least one secondary node, a first and a second configuration frame received from neighboring secondary nodes, wherein the comparison of the first and second configuration frames includes checking the last appended node IDs or the ingress port IDs in the two configuration frames to determine the direction of primary and secondary data paths of the tree;

generate a reverse configuration frame by transferring information from the first configuration frame to the second configuration frame;

send the reverse configuration frame to a parent node of the comparison node from which the first and second configuration frames were received;

wait for a reverse configuration frame to be received at all ports of the parent node through which the configuration frame was previously flooded;

configure the one or more fork nodes to not take any decision based on the reverse configuration frame for forming the primary and secondary data path when a peering fork node is not within the same hierarchy or a common parent hierarchy as the fork node; and receive two reverse configuration frames at the primary node, the primary node configured to set a first direction of the smallest node ID as the primary data path, and a second direction of the next smallest node ID as the secondary data path.

7. The system of claim 6, wherein the network establishing a communication channel between the primary and secondary nodes is a uni-directional link or a bi-directional link.

8. The system of claim 6, wherein the network is a Carrier Ethernet network.

* * * * *